United States Patent
Wipasuramonton et al.

(10) Patent No.: US 8,764,056 B2
(45) Date of Patent: Jul. 1, 2014

(54) AIRBAG MODULE AND METHOD FOR CONTROLLING GAS THEREIN

(71) Applicant: TK Holdings Inc., Auburn Hills, MI (US)

(72) Inventors: Pongdet Paul Wipasuramonton, Rochester, MI (US); Jonathan Lee Clarke, Troy, MI (US); Jonathan Richard Kibat, Warren, MI (US); Sara Amber Colburn, Shelby Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/657,743

(22) Filed: Oct. 22, 2012

(65) Prior Publication Data

US 2013/0099470 A1    Apr. 25, 2013

Related U.S. Application Data

(60) Provisional application No. 61/550,023, filed on Oct. 21, 2011.

(51) Int. Cl.
*B60R 21/233* (2006.01)

(52) U.S. Cl.
CPC .................................. *B60R 21/233* (2013.01)
USPC ...................... 280/743.1; 280/729; 280/730.2

(58) Field of Classification Search
USPC .................... 280/729, 730.2, 736, 742, 743.1
See application file for complete search history.

(56) References Cited

U.S. PATENT DOCUMENTS

| 6,802,529 B2 | 10/2004 | Takedomi et al. |
| 7,063,350 B2 | 6/2006 | Steimke et al. |
| 7,168,733 B2 | 1/2007 | Kumagai et al. |
| 7,278,656 B1 | 10/2007 | Kalandek et al. |
| 8,356,835 B2 * | 1/2013 | Yamamoto ................. 280/730.2 |
| 8,485,550 B2 * | 7/2013 | Kino et al. ................. 280/730.2 |
| 2006/0175809 A1 | 8/2006 | Yamaji et al. |
| 2009/0020987 A1 * | 1/2009 | Wipasuramonton et al. . 280/729 |

(Continued)

FOREIGN PATENT DOCUMENTS

| JP | 10-100827 A | 4/1998 |
| KR | 10-0814672 B1 | 3/2008 |

(Continued)

OTHER PUBLICATIONS

International Search Report PCT/US2012/061383 dated Mar. 29, 2013.

*Primary Examiner* — James English
(74) *Attorney, Agent, or Firm* — Foley & Lardner LLP (57) ABSTRACT

An airbag module for a motor vehicle includes an inflatable airbag cushion, an inflator, and a flow director. The inflatable airbag cushion includes one or more panels that form an inflatable portion. The inflator is configured to provide inflation gas for inflating the airbag cushion upon deployment. The flow director is configured to direct inflation gas into the inflatable portion. The inflatable portion includes a first inflatable region and a second inflatable region. The flow director is configured to direct the inflation gas directly into the first inflatable region. The first inflatable region and the second inflatable region are in fluidic communication, and a check valve permits the inflation gas to flow from the first inflatable region to the second inflatable region and prevents the inflation gas from flowing from the second inflatable region to the first inflatable region.

20 Claims, 8 Drawing Sheets

(56) References Cited

U.S. PATENT DOCUMENTS

| | | | |
|---|---|---|---|
| 2010/0181749 A1* | 7/2010 | Sugimoto | 280/743.2 |
| 2011/0079991 A1 | 4/2011 | Ravenberg et al. | |
| 2011/0272927 A1* | 11/2011 | Feller et al. | 280/729 |
| 2011/0285114 A1* | 11/2011 | Ohara et al. | 280/730.1 |
| 2012/0043741 A1* | 2/2012 | Yamamoto | 280/730.2 |
| 2012/0056410 A1* | 3/2012 | Yamamoto | 280/730.2 |
| 2012/0248746 A1* | 10/2012 | Yamamoto | 280/729 |
| 2013/0033022 A1* | 2/2013 | Yamamoto | 280/730.2 |

FOREIGN PATENT DOCUMENTS

| | | |
|---|---|---|
| WO | WO-00/07854 A1 | 2/2000 |
| WO | WO-2011/010386 A1 | 1/2011 |
| WO | WO 2011077510 A1 * | 6/2011 |

* cited by examiner

AIRBAG MODULE AND METHOD FOR CONTROLLING GAS THEREIN

CROSS REFERENCE TO RELATED APPLICATIONS

This application claims priority to and the benefit of U.S. Provisional Patent application No. 61/550,023 filed Oct. 21, 2011. The foregoing provisional patent application is incorporated by reference herein in its entirety.

BACKGROUND

The present application relates generally to the field of airbags for use in vehicles to provide occupant restraint. More specifically, the present application relates to airbag modules having airbag cushions configured to control the pressure within the airbag cushion to provide restraint of an occupant more efficiently, such as by using less inflation gas.

SUMMARY

An airbag module for a motor vehicle includes an inflatable airbag cushion, an inflator, and a flow director. The inflatable airbag cushion includes one or more panels that form an inflatable portion. The inflator is configured to provide inflation gas for inflating the airbag cushion upon deployment. The flow director is configured to direct inflation gas into the inflatable portion. The inflatable portion includes a first inflatable region and a second inflatable region. The flow director is configured to direct the inflation gas directly into the first inflatable region. The first inflatable region and the second inflatable region are in fluidic communication, and a check valve permits the inflation gas to flow from the first inflatable region to the second inflatable region and prevents the inflation gas from flowing from the second inflatable region to the first inflatable region.

An airbag module for a vehicle includes an inflatable airbag cushion and an inflator. The inflatable airbag cushion includes one or more panels coupled together at a perimeter seam to form an inflatable portion therebetween. The inflator is configured to provide inflation gas for inflating the airbag cushion upon deployment. One or more inner walls are coupled to opposing sides of the airbag cushion to form a first chamber and a second chamber of the inflatable portion. A check valve permits the inflation gas to flow from the first chamber to the second chamber and prevents the inflation gas from flowing from the second chamber to the first chamber.

DETAILED DESCRIPTION

Airbag modules or systems (e.g., side-impact, front-impact) are located in vehicles to restrain occupants (e.g., driver, passenger) during a dynamic vehicle event (e.g., a front-impact, a side-impact, a rollover event, etc.). An airbag system typically includes an inflatable airbag cushion that deploys from a stored configuration, during a dynamic vehicle event, wherein the cushion inflates from gas which is rapidly pushed into the airbag cushion by means of an inflator or other inflation (e.g., gas generating) device. The inflated airbag cushion may restrain the occupant or a portion (e.g., torso, head, neck, knees) of the occupant to reduce the likelihood of impact between the occupant and other vehicle components (e.g., doors, dashboards, steering wheels). The inflator may use a device, such as a pyrotechnic device or other airbag inflation device, to generate gas almost instantaneously and to push the gas at a high volumetric flow rate into the inflatable airbag cushion of the airbag system to enable the airbag cushion to deploy or inflate over a very short period of time.

An airbag cushion or airbag may be stored within and deployed from almost anywhere in a vehicle 10. For example, airbag cushions are stored within and deployed from the inside or outside facing side-surfaces of the seat-back of a seat assembly 12. Also, for example, airbag cushions are stored within and deployed from the dashboard 14, from the steering column 16, and/or from a side curtain 18 of the vehicle 10.

Airbag cushions are typically packaged for storage through a process involving folding, rolling, or a combination thereof to compact the airbag in order for it to fit into the small storage volume (e.g., a portion of the seat back of a seat system, steering wheel, etc.) containing the stored airbag cushion. Airbag modules may be used to provide restraint to any occupant located in any seating row (e.g., first, second, third, etc.) or any seat configuration (e.g., bucket seat, bench seat, etc.) of any vehicle.

Most airbag cushions fill with inflation gas to a high working pressure, which is configured based on the appropriate amount of restraint required to restrain an occupant during a vehicle crash. As the deployed airbag cushion is loaded, such as by an occupant after contact, the airbag cushion is compressed thereby reducing the internal volume of the cushion. Typically, during loading of the cushion, inflation gas is vented outside the airbag cushion, such as through a vent hole, to reduce the internal pressure of the cushion to thereby maintain an appropriate reaction force to the occupant from the cushion.

Figure 2:
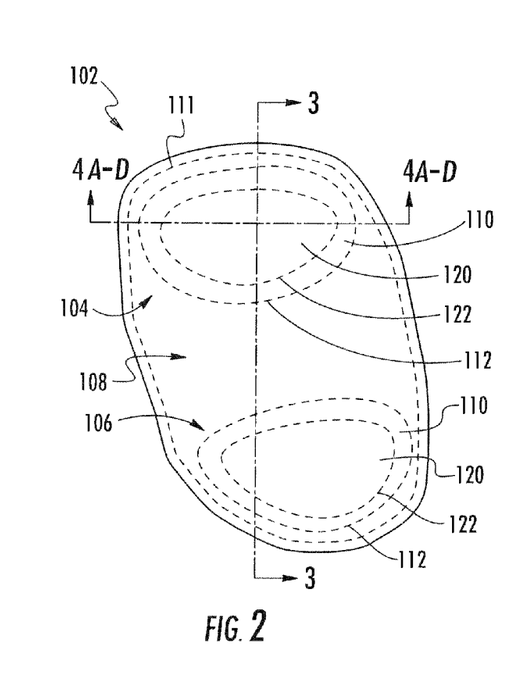
FIG. 2 is a side view of an exemplary embodiment of an airbag cushion for use in a side-impact airbag module.
Figure 3:
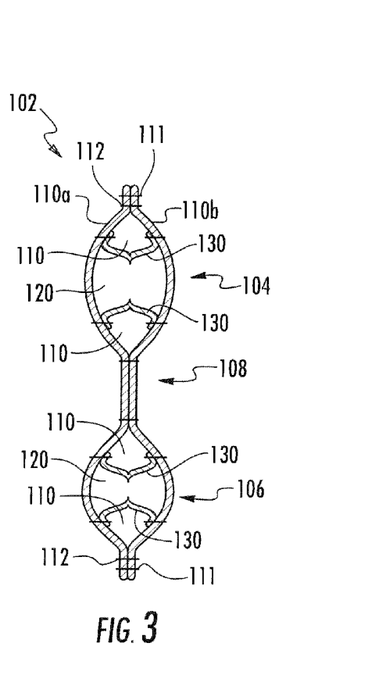
FIG. 3 is a cross-sectional view showing a support located between two panels of the airbag cushion of FIG. 1, shown prior to deployment.
Figure 5:
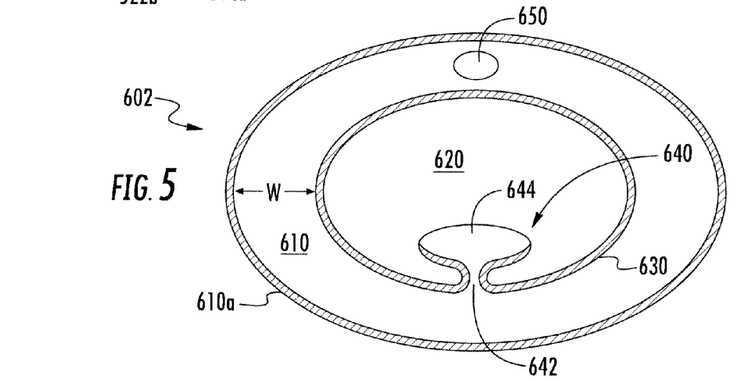
FIG. 5 is a cross-sectional view of the inflatable region of the airbag cushion of FIG. 4C taken along line 5-5.

As shown in FIGS. 2 and 3, according to an exemplary embodiment, an airbag module 100 includes an airbag cushion 102 that includes at least one inflatable region 104, wherein the inflatable region 104 includes a first or primary chamber 110 that is directly inflated by the inflation gas, such as from the inflator, and a second or secondary chamber 120 that is inflated by gas that enters the secondary chamber 120 from the primary chamber 110 through a passage, such as a passage in a check valve (e.g., as described in further detail below with regard to FIG. 5). Accordingly, the airbag cushions 102, as disclosed herein, are configured to provide a relatively high pressure through a relative low amount (e.g., volume) of inflation gas to restrain an occupant. The airbag cushion is able to inflate in a relative short period of time, due in part, to the relative low volume in the inflatable region 104 (e.g., the primary chamber 110), and because the secondary chamber 120 (e.g., having smaller than the primary chamber) receives gas from the primary chamber 110, such as upon increasing pressure in the primary chamber 110 (e.g., due to inflation gas entering the primary chamber 110 from the inflator or upon loading from the occupant), the secondary chamber 120 quickly increases to a relative high pressure through a relative low amount (e.g., volume) of inflation gas when loaded by the occupant.

Upon airbag deployment, the primary chamber 110 is inflated directly with the inflation gas, causing the pressure in the primary chamber 110 to increase rapidly, due in part to the relative low volume of the primary chamber 110. The passage or throat that fluidly connects the primary and secondary chambers 110, 120 may restrict the flow of the fluid into the secondary chamber 120, such that the primary chamber 110 inflates in advance of the secondary chamber 120. Upon increasing pressure in the primary chamber 110 (e.g., due to receiving inflation gas and/or loading), inflation gas is transferred from the primary chamber 110 to the secondary chamber 120 through the passage, wherein the internal pressure of the secondary chamber 120 rapidly increases to the target level (e.g., the working pressure) to provide occupant restraint. The airbag cushion 102 also includes a check valve mechanism that allows the inflation gas to rapidly fill the secondary chamber 120 from the primary chamber 110, then prohibits or restricts the gas from expelling or escaping from the secondary chamber 120 back to the primary chamber 110 during loading and compression of the secondary chamber 120 by an occupant.

The airbag cushion 102 having the second or secondary chamber 120 configured in this manner allows for the airbag module 100 to be more efficient because less inflation gas may be used to achieve a similar working pressure when compared to conventional airbags. The airbag cushion 102 having the secondary chamber 120 may also inflate having a relative lower peak pressure with a similar working pressure when compared to conventional airbags. For example, the secondary chamber 120 may have a lower starting pressure (e.g., as compared to conventional airbags) and allow for a reduced amount (e.g., volume) of gas to be vented from the cushion 102 (see, e.g., FIG. 13 as discussed below). Further, because the amount of gas that is vented from the airbag cushion 102 is reduced, the total amount of inflation gas required to inflate the airbag cushion 102 may be reduced. Accordingly, the airbag module 100 having a secondary chamber 120 may be configured with a smaller and less expensive inflator. In other words, the airbag module 100 having a secondary chamber 120 may use a smaller amount of inflation gas to provide substantially the same restraint to the occupant in the form of the working pressure of the secondary chamber 120, relative to a conventional airbag module.

Figure 1:
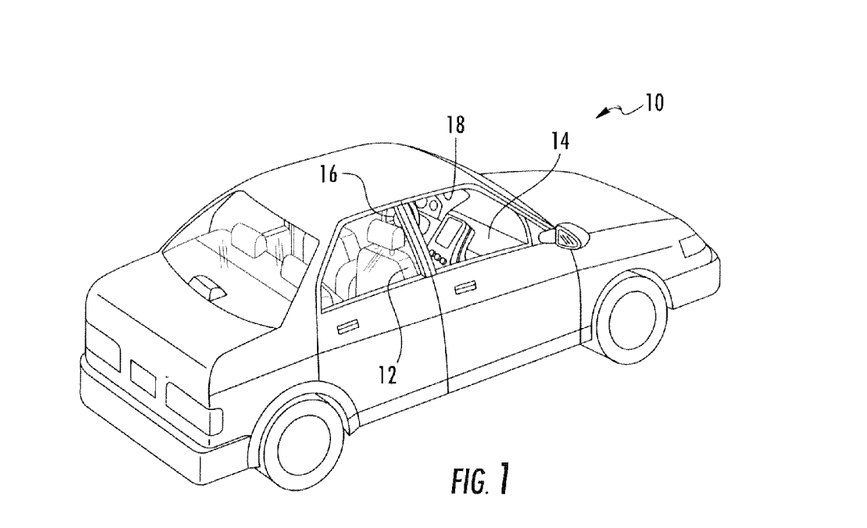
FIG. 1 is a perspective view of a vehicle having at least one airbag module therein.

FIG. 1 illustrates an exemplary embodiment of a vehicle 10 (e.g., a motor vehicle) that includes a passenger compartment having at least one airbag module configured to provide restraint to a seated occupant. The vehicle 10 is shown as a typical sedan, but the airbag modules disclosed herein may be included in any vehicle having at least one occupant where passive restraint of the occupant is desired. Additionally, the airbag modules disclosed herein may be used to provide occupant restraint during any vehicle impact event (e.g., frontal impact, side impact) and may restrain any occupant (e.g., driver, passenger). In other words, the airbag cushions, as disclosed herein, may be configured into any airbag module, such as, for example, a driver front-impact airbag module, a passenger front-impact, a driver side-impact airbag module, a passenger side-impact airbag module, a side-curtain airbag module, and a knee airbag module. It should be noted that the airbag modules described and illustrated herein are meant as examples, and are not meant as limitations.

FIGS. 2 and 3 illustrate an inflatable side-impact airbag cushion 102 for use in an airbag module 100 that also includes an inflator configured to inflate the airbag cushion 102 upon deployment. As shown, the inflatable cushion 102 includes a first inflatable region 104 (e.g., a shoulder region), a second inflatable region 106 (e.g., a pelvis region), and a third region 108 provided between the first and second regions 104, 106, wherein the first region 104 is configured to provide restraint to the thorax (e.g., shoulder- and/or upper rib region) of a restrained occupant and the second region 106 is configured to provide restraint to the pelvis (e.g., hip region) of the restrained occupant. The third region 108 may be configured to be a non-inflatable region or an inflatable region having a low pressure relative to the first and second regions 104, 106 during deployment, since the third chamber 108 may experience no loading or low loading. The airbag 102 may have any number of inflatable regions and/or any number of non-inflatable regions.

As shown, the first inflatable region 104 and the second inflatable region 106 include both first or primary and second or secondary chambers 110, 120. Upon loading of the first and/or second inflatable region 104, 106, such as by the pelvis or shoulder of the occupant, the volume in the primary chamber 110 may be reduced by the compression forces exerted by the accelerating occupant causing the inflation gas to pass from the primary chamber 110 to the secondary chamber 120 inducing the internal pressure in the secondary chamber 120 to increase to the relative higher pressures required for pelvic and shoulder restraint. Additionally, the pressure in the third chamber 108 may remain lower (relative to the first and second regions) to provide restraint to the sensitive rib and abdominal areas. The pressure in the third chamber 108 may remain lower in part due to the relative lower impact forces cause a relative smaller reduction in volume of the third chamber 108 of the cushion 102. The third chamber 108 may also utilize venting, such as through a vent hole, where the vent hole allows inflation gas to escape to outside the airbag cushion to help maintain a relative low pressure. It should be noted that the inflatable cushion 102 may include any number of inflatable regions having any number of primary and secondary chambers 110, 120, wherein the chambers may be positioned anywhere on the airbag cushion 102.

As shown in FIGS. 2 and 3, the airbag cushion includes two main panels 110a, 110b coupled together at a peripheral seam 111 of the cushion 102 and/or an intermediate seam 112 to form boundary walls that define the regions (e.g., inflatable regions 104, 106) and outer peripheries of the primary chambers 110 of the airbag cushion 102. However, the airbag cushion 102 may include a single panel or a plurality of panels that form the boundary walls of cushion. The main panel(s) 110a, 110b may be made from a fabric or any suitable material, where the main panels 110a, 110b are coupled together at seams 111, 112, such as through stitching, to form the inflatable regions (e.g., first and second inflatable regions 104, 106) of the airbag cushion 102. The main panels 110a, 110b may have an elongated elliptical shape, a circular shape, or any suitable shape. For example, the airbag cushion 102 may include a first main panel 110a and a second main panel 110b provided adjacent to the first main panel 110a. The first and second main panels 110a, 110b may have similar shapes, such that when coupled together at the seams 111, the panels 110a, 110b form the outer periphery or profile of the airbag cushion 102.

The airbag cushion 102 may also include a wall 130 (e.g., inner wall), or a plurality of walls or wall portions, where the wall(s) 130 separates the inflatable region(s) 104, 106 into the primary and secondary chambers 110, 120. In other words, the wall 130 is disposed inside the inflatable region to form a separator between the primary and secondary chambers 110, 120 to prohibit the inflation gas from passing between the chambers 110, 120. Each wall 114 may be made from a fabric or any suitable material and may be coupled to another wall or to a panel (e.g., a main panel 110a, 110b) at a seam 122, such as through stitching.

Figures 4A, 4B, 4C, 4D:
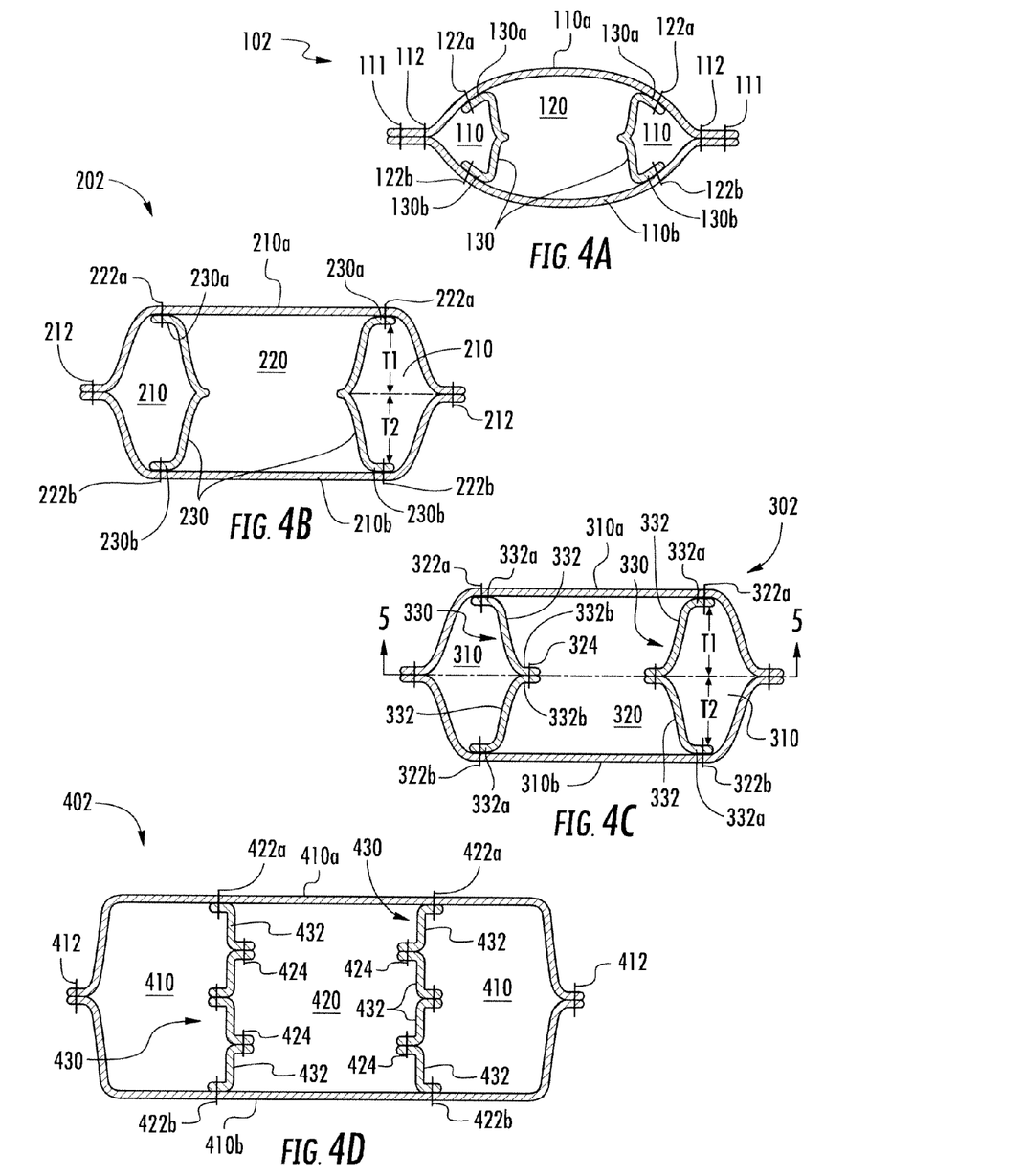
FIG. 4A is a cross-sectional view of the airbag cushion of FIG. 2 taken along line 4A-4A according to an exemplary embodiment.
FIG. 4B is a cross-sectional view of the airbag cushion of FIG. 2 taken along line 4B-4B according to another exemplary embodiment.
FIG. 4C is a cross-sectional view of the airbag cushion of FIG. 2 taken along line 4C-4C according to another exemplary embodiment.
FIG. 4D is a cross-sectional view of the airbag cushion of FIG. 2 taken along line 4D-4D according to another exemplary embodiment.

FIG. 4A-4E illustrate various exemplary embodiments of inflatable regions of airbag cushions, each of which include a check valve (e.g., as shown in FIG. 5). It should be noted that various portions of the different panels and/or seams are not depicted (e.g., the surface of walls 130 as it wraps around to form the back surface of chamber 120, the joining or seams of panels walls 130 to panels 110a, 110b as the wall wraps around the back of chamber 120, or similar surfaces, seams, joints of other components with like reference numerals, such as 230, 330, 332, etc.) As shown in FIG. 4A, the airbag cushion 102 includes an inflatable region that is offset from the edges or seam 111 of the main panels 110a, 110b that define the boundary of the cushion 102, where the main panels 110a, 110b are coupled together at two seams 111, 112, such that the two seams 111, 112 between the main panels may form a non-inflatable region disposed outside of the inflatable region. The inflatable region includes a primary chamber 110 and a secondary chamber 120 separated through a wall 130 having first and second ends 130a, 130b. The first end 130a of the wall 130 is coupled to a main panel 130a at a seam 122a, such as through stitching, and the second end 130b of the wall 130 is coupled to another main panel 110b at another seam 122b. As shown in FIG. 4B, another exemplary embodiment of the airbag cushion 202 has no offset between the boundary and the inflatable region, as the seam 212 that defines the outer boundary of the cushion 202 also defines the outer edge of the inflatable region (e.g., the primary chamber 210) of the cushion 202. The wall 230 may span the distance (e.g., length) between the main panels 210a, 210b, such as the sum of the thickness T1 and the thickness T2, where the thickness T1 corresponds to the approximate length (when the cushion is deployed) from one main panel 210a to the seam 212 coupling the main panels 210a, 210b and T2 corresponds to the approximate length from the opposing main panel 210b to the seam 212.

As shown in FIG. 4C and FIG. 5, the wall 330 includes two walls or wall portions 332, 334 that are coupled together at a seam 324 at inner ends 332b, 334b thereof, such as through stitching, to form the inner separator between the primary and secondary chambers 310, 320 of the inflatable region of the cushion 302. The seam 324 may be disposed within the secondary chamber 320, as shown, or may be disposed within the primary chamber 310. The seam 324 located between the wall portions 324 may also be configured to form a passage 342, where a check valve 340 may be provided around the passage 342. The wall 330 may span the distance (e.g., length) between the main panels 310a, 310b, such as the sum of the thickness T1 and the thickness T2, where the thickness T1 corresponds to the approximate length (when the cushion is deployed) from one main panel 310a to the seam 324 coupling the walls or wall portions 332 and T2 corresponds to the approximate length from the opposing main panel 310b to the seam 324. Accordingly, the thicknesses T1 and T2 may be similar or dissimilar, and may be varied to tailor the total thickness of the secondary chamber 320, such as when inflated. In other words, the lengths of the walls or wall portions 332 may be uniform or may vary, depending on the construction of the airbag cushion 302.

As shown in FIG. 4D, the wall 430 separating the primary and secondary chambers 410, 420 includes a plurality of wall portions 432, where each pair of adjacent wall portions 432 are coupled together at an adjoining seam 424, such as through stitching. Each seam 424 may be disposed within the secondary or primary chamber 420, 410, and may have an alternating configuration, as shown, or may have any suitable configuration. The outer wall portion(s) 432 may have their respective outer end coupled to the main panels 410a, 410b at seams 422a, 422b, where the seam may be disposed in either the primary or secondary chambers 410, 420. It should be noted that the seams may have any suitable configuration, which may be inside or outside of the one of the chambers 410, 420 or may be inside or outside of the airbag cushion 402, and those embodiments disclosed herein are not meant as limitations.

Figures 10A, 10B:
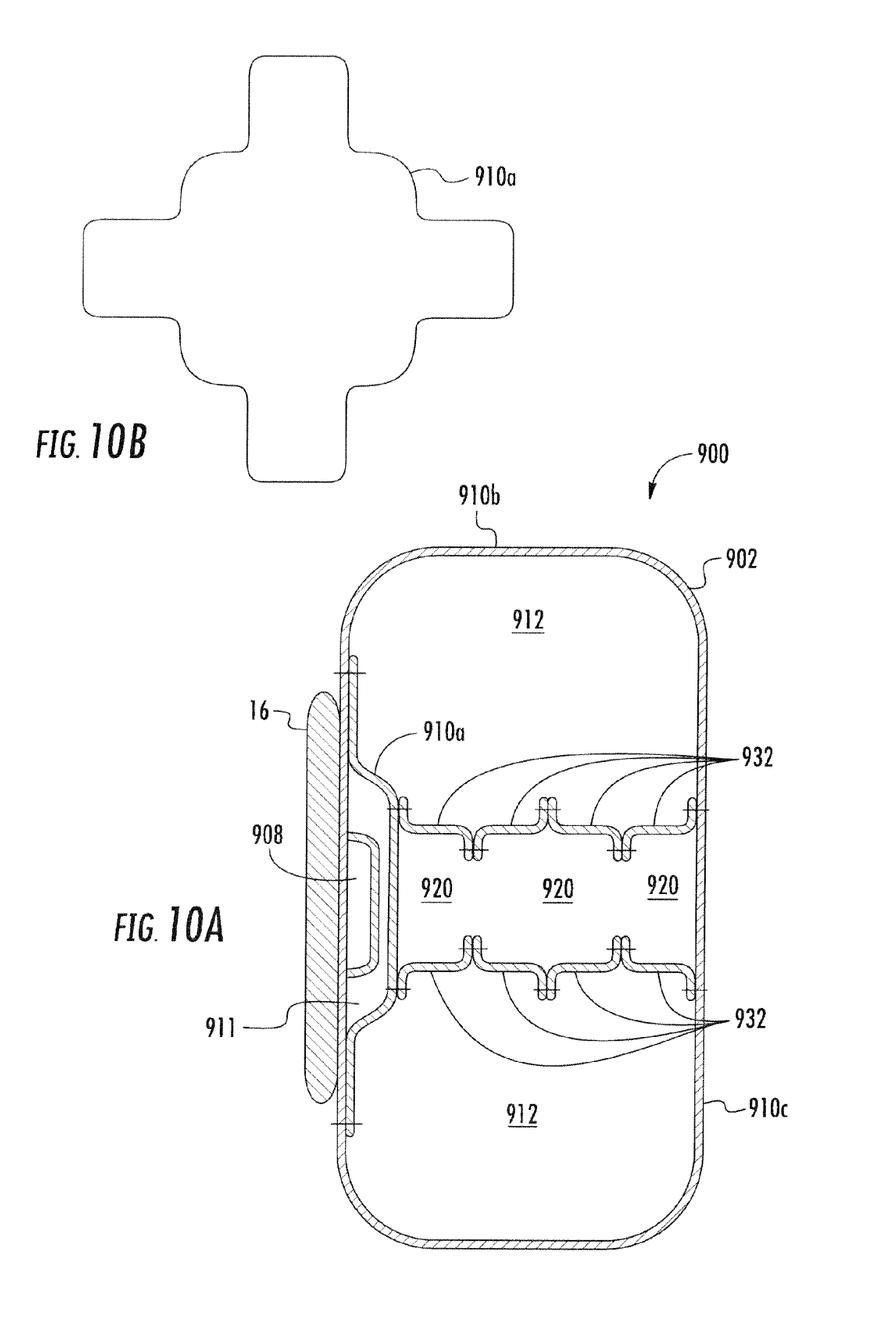
FIG. 10A is a side cross-sectional view of a driver airbag module having an airbag cushion according to an exemplary embodiment.
FIG. 10B is a plan view of a base panel of the airbag cushion of FIG. 10A.

According to various exemplary embodiments, the plurality of walls (e.g., 130, 230, 330, 332, 430, 432, etc.) may have similar or dissimilar lengths to thereby provide the cushion with multiple layers of cushion having similar or dissimilar thicknesses, such that the multiple layers are stacked or provided adjacent to at least one other layer. In other words, the layers of the cushion may be defined by a single wall or wall portion that extends the total thickness between the main panels, by a pair of coupled walls or wall portions that together extend the thickness between the main panels, or any number of walls or wall portions. This configuration may form a relative tall or thick airbag cushion, which may be preferable, for example, for front-impact airbag modules that typically include an airbag cushion that deploys a relative longer distance to restrain the occupant and therefore have a thicker or taller airbag cushion. An example of a front impact airbag module having a plurality of walls (e.g., wall portions) is shown in FIG. 10, which is discussed in greater detail below.

As shown, each wall may include one or more wall portions configured to form a fluid (e.g., air, gas) separator between the primary and secondary chambers. Each wall or wall portion may be made from a fabric (e.g., airbag panel fabric) or any suitable material and may be configured having any suitable shape, where the walls may be similar or dissimilar in shape. Each wall may be coated or sealed to prohibit or reduce the amount of gas that may escape, such as, in the event the wall is made from a porous material.

Figure 4E:
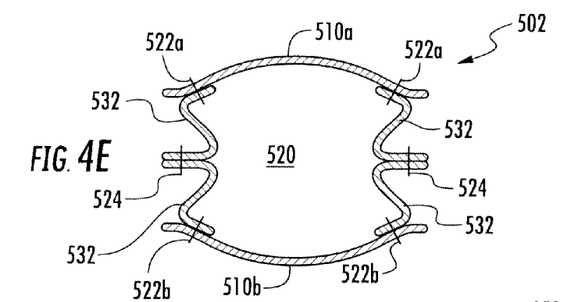
FIG. 4E is a cross-sectional view of the airbag cushion of FIG. 2 taken along line 4E-4E according to another exemplary embodiment.

As shown in FIG. 4E, the airbag cushion 502 may include two main panels 510a, 510b and a pair of inner walls or wall portions 532 coupled together at an inner seam 524 and coupled to the main panels 510a, 510b at outer seams 522a, 522b to form a secondary chamber 520 therein. The inner walls 532 may be coupled together at the ends opposite the ends coupled to the main panels 510a, 510b, such as outside the secondary chamber 520, whereby the inner wall seam 524 may face away from the secondary chamber 520. In other words, the inner seam 524 is configured to be located outside the secondary chamber 520. However, as shown in other embodiments, the inner seam may be located inside the secondary chamber. The outer seams that couple the ends of the inner walls to the main panels may be configured with the inner wall on the inside surface of the main panel, or may be configured with the inner wall wrapping over and coupled to the outside surface of the main panel.

FIG. 5 shows a cross-sectional view of the inflatable region of the airbag cushion 602 (e.g., as shown in FIGS. 4A-4E). An airbag cushion 602 having an inflatable region with a secondary chamber 620 may be located anywhere on an airbag cushion 602, such as on the upper portion of the airbag cushion 602, as shown in FIG. 2. The secondary chamber 620 of the inflatable region is located on the airbag cushion 602 to restrain the occupant, such as the thorax (e.g., shoulder) of the occupant, during deployment. The inflatable region may be circular shaped, elliptical shaped, or have any suitable shape. The primary and secondary chambers 610, 620 may also have any suitable shape. For example, the primary chamber 610 may be elliptical in shape having a secondary chamber 620 provided therein, where an inner wall 630 separates the chambers 610, 620. In other words, the primary chamber 610 may at least partially surround the secondary chamber 620 (e.g., the primary chamber 610 may be donut shaped with the secondary chamber 620 disposed within the center of the donut shaped primary chamber 610). The one or more walls 630 that separate the chambers 610, 620 may be coupled to the main panels (e.g., 610a) and/or to other walls 630 to thereby form and define the inflatable boundary of the secondary chamber 620.

The airbag cushion may also include a check valve mechanism (e.g., check valve). The check valve mechanism is configured to control the flow of fluid (e.g. inflation gas) between the chambers of the airbag cushion, such as between a primary chamber and an adjacent secondary chamber. The airbag cushion having a secondary chamber and check valve mechanism is configured to reduce the internal pressure in the primary chamber by reducing the volume of gas therein, such as by transferring gas from the primary chamber to the secondary chamber, to thereby rapidly increase the pressure and volume of gas in the secondary chamber to a predetermined level (e.g., the working pressure) to provide a restraint to the occupant. During deployment, the inflation gas inflates the primary chamber of the inflatable region of the airbag cushion, thereby separating the main panels by increasing the volume of gas and internal pressure in the primary chamber. The inflation of the primary chamber and separation of the main panels causes the secondary chamber to be initially under a vacuum state (i.e., inflation of the primary chamber causes the main panels to separate in a region of the secondary chamber, thereby reducing the pressure in the secondary chamber). Upon loading of the primary chamber (e.g., due to impact by the occupant with the deployed airbag cushion), the check valve mechanism allows gas to flow from the primary chamber to the secondary chamber through an opening or passage in the check valve. The vacuum state or reduced pressure of the secondary chamber induces the gas to flow at a relative quicker flow rate from the primary chamber to the secondary chamber. The gas flows from the primary chamber to the secondary chamber until the pressure in the secondary chamber is greater than or approximately equal the relative pressure in the primary chamber, whereby the check valve mechanism is configured to close the opening between the primary chamber and the secondary chamber to prohibit the gas to flow from the secondary chamber back to the primary chamber.

As shown in FIG. 5, for example, the inflatable region of the airbag cushion 602 includes a check valve 640 provided between the primary and secondary chambers 610, 620. For example, the check valve 640 may be integral with and/or formed by the wall 630 (e.g., at the seam or joint between two wall portions as described above), or by a separate device or mechanism. The check valve 640 includes a passage 642 (e.g., throat) that fluidly communicates the primary chamber 610 and the secondary chamber 620. In other words, the passage 642 allows gas to flow therethrough, such as to allow inflation gas to enter the secondary chamber 620 from the primary chamber 610. The check valve 640 is configured to have a body 644 (e.g., formed by a portion of one or more inner walls or extensions or portions thereof) that extends from the inner wall 630 that defines the passage 642 (e.g., between wall portions), and an opening in the body to allow gas to flow from the body 644, such as into the secondary chamber 620. The body 644 is configured to be coupled to the wall 630 provided between the secondary chamber 620 and the primary chamber 610 around an opening (e.g., hole) in the wall 630 to thereby define the passage 642 for the gas to enter the body 644 from the primary chamber 610 of the inflatable portion to flow through the opening and passage 642 into the secondary chamber 620. The inner wall 630 to main panel (e.g., 610a) seam may be joined at the outer edge of the of the inner panel 630, so that upon deployment, as the main panels are pushed apart by the inflation of the cushion 602, the volume of gas opens the passage 642 between the chambers 610, 620. The passage 642 allows for the gas to flow therethrough to enter the chamber (e.g., secondary chamber 620). The size and shape of the body 644 and the passage 642 may be varied, such as based on the desired flow rate of gas through the passage 642. The opening in the body 644 may be located anywhere, such as opposing the passage 642, whereby inflation gas that enters the check valve 640 may exit through the opening into the secondary chamber 620. The body 644 of the check valve 640 may be elongated to help fill the passage 642 to close off the opening, such as when the pressure in the secondary chamber 620 exceeds or equals the pressure in the primary chamber 610 (e.g., the body 644 of the chamber wall begins to move through the passage or opening but is stopped and held in place by the seam 624). The opening and passage 642 are closed by the body 644 of the check valve 640 to prohibit the inflation gas from escaping from the secondary chamber 620 back to the primary chamber 610 in order to maintain a relative high pressure in the secondary chamber 620.

The airbag cushion may include a vent 650 (e.g., vent hole) that is configured to allow the release of inflation gas, such as during deployment when the pressure in the cushion has reached a desired level. For example, the primary chamber 610 of the inflatable region may include an optional vent hole 650 that is configured to allow the release of inflation gas from the primary chamber 610, such as during loading of the primary chamber 610 after the check valve 640 has closed the passage 642 to the secondary chamber 620. The vent hole 650 may be added to tailor the energy absorbing characteristics of the airbag cushion 602, such as, to provide an improved ride-down of the occupant following contact between the occupant and the cushion 602. Although the vent hole 650 is shown in primary chamber 610 in FIG. 5, the vent hole 650 may be located anywhere on the cushion 602. In addition, the airbag cushion 602 may include a plurality of vent holes that may be located on different areas of the airbag cushion 602, such as a first vent hole in the primary chamber 610 of the inflatable region and a second vent hole located in the third region of the cushion (e.g., as shown in FIG. 2). According to another exemplary embodiment, a wall (e.g., wall portion) may include a vent hole to allow gas to pass between the chambers of the of the inflatable region.

Figure 6:
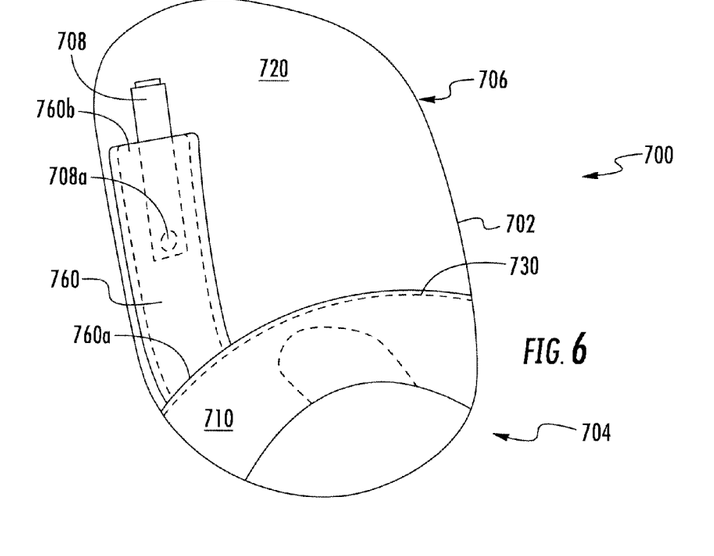
FIG. 6 is a partial side view of a side-impact airbag module having an airbag cushion according to another exemplary embodiment.

FIGS. 6-8A illustrate another exemplary embodiment of a side-impact airbag module 702 (FIG. 6 depicting airbag cushion with one of the main panels forming the airbag cushion 702 removed in order to show the interior). The airbag module 700 includes an inflatable airbag cushion 702 having a lower (e.g., pelvis) inflatable region 704 and an upper inflatable region 706, an inflator 708 configured to inflate the airbag cushion 702 upon deployment, and a flow director or baffle 760 configured to direct the inflation gas from the inflator 708 directly into the pelvis inflatable region 704 (e.g., having a first or primary chamber 710 as described above, as shown in FIG. 8A). The pelvis inflatable region 704 and/or the upper inflatable region 706 may include a secondary chamber 720 that is configured to receive inflation gas through a check valve 740 (e.g., as described above in inner wall 730), such as, for example, a secondary chamber 720 that is configured as discussed above.

The inflator 708 may be coupled to the seat or another structural component of a vehicle or may be coupled to a housing that is configured to be coupled to the seat or other component. The location where the inflator 708 and/or housing is coupled may be at a location that is disposed above the pelvis inflatable region 704, such as proximate the upper inflatable region 706. Accordingly, the baffle 760 may be used to direct inflation gas from the inflator 708 directly to the pelvis inflatable region 704 (e.g., into the first or primary inflatable chamber 710), where the inflation gas may indirectly inflate the upper inflatable region 706 (e.g., the second or secondary inflatable chamber 720), such as through a check valve 740 between the primary and secondary chambers 710, 720 in the lower and upper inflatable regions 704, 706. Thus, an outlet 708a of the inflator 708 may be in fluid communication with an inlet of the baffle 760, and an outlet 760a of the baffle 760 may be in fluid communication with an inflatable region (e.g., a pelvis inflatable region 704 and the primary chamber 710), such that inflation gas flows from the inflator 708 to the inflatable region 704 through the baffle 760. This configuration may decrease the inflation time of the pelvis inflatable region 704, such as in situations where loading on the airbag 702 occurs prior to when inflation gas stops flowing into the cushion 702 or prior to when the relative pressure between the secondary chamber 720 (e.g., in the upper inflatable region 706) and another chamber (e.g., the primary chamber 710 in the lower inflatable region 704) may come into equilibrium. This configuration may allow the pressure in the inflatable region having the secondary chamber 720 (e.g., in the upper inflatable region 706) to be slightly higher than the relative pressure in the remaining inflatable regions of the airbag cushion 702 (e.g., the primary chamber 710 in the lower inflatable region 704).

The flow director or baffle 760 may also include a second outlet 760b (or more outlets), where the second outlet 760b opens into another (e.g., a thorax) inflatable region 706. Thus, a baffle may include a first end or outlet 760a configured to direct inflation gas to a first inflatable region 704 (e.g., into a first or primary chamber 710) and a second end or outlet 760b configured to direct inflation gas to a second inflatable region 706 (e.g., into a second or secondary chamber 720), such that the inflator may be proximate a third region, where during deployment, the first and second regions 704, 706 (e.g., primary and secondary chambers 710, 720) receive the inflation gas directly from the inflator 708. The baffle 760 may be made out of any suitable material, such as conventional airbag material, and form any suitable shape that helps direct the inflation gas from a first location to at least a second location. As shown in FIG. 6, the baffle 760 is tube-shaped and extends in length from the inflator 708 to the pelvis inflatable region 704. However, it should be noted that the baffle 760 may have any suitable shape, such as an L-shape, and any suitable geometry. The baffle 760 may direct inflation gas to any region of the airbag cushion, such as the pelvis inflatable region 704, to decrease the time required to inflate the chambers (e.g., primary chamber 710) provided in the region.

Figure 8A:
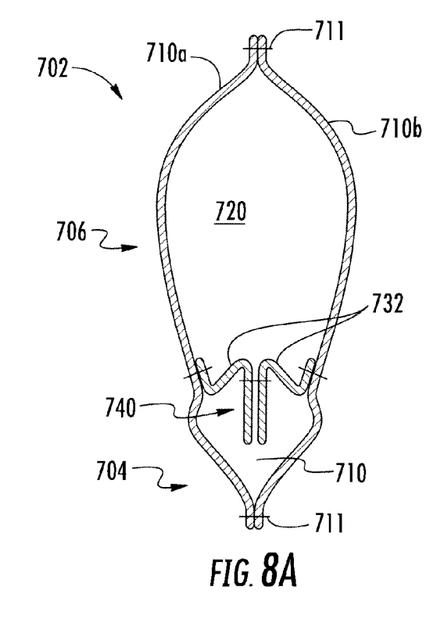
FIG. 8A is a cross-sectional view of the airbag cushion of FIG. 7.
Figure 8B:
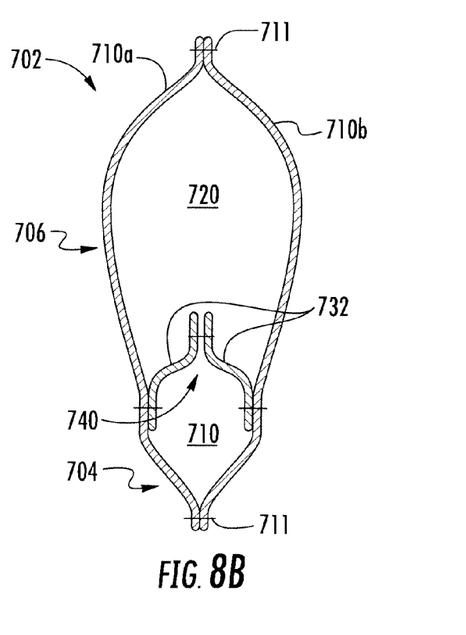
FIG. 8B is another cross-sectional view showing an alternate configuration of the airbag cushion of FIG. 7.

The region (e.g., 706) of the airbag cushion 702 having the secondary chamber 720 may also include a check valve 740, such as a check valve in inner wall 730 that is configured as discussed above, to allow inflation gas to flow only in a single direction (e.g., into the secondary chamber 720 from the primary chamber 710). As shown in FIGS. 8A and 8B, the check valve 740 may be integrated into a wall or plurality of walls 730, such as, a pair of inner walls 732 extending between the panels 710a, 710b of the airbag cushion 702. The check valve 740 that is integrated in the inner walls 732 allows the airbag cushion 702 to maintain an outer periphery or profile of the cushion, such that the total volume of the chamber is not increased. The check valve 740 may also be formed by joining the inner wall 732 of the cushion to the panel 710a or 710b at the perimeter seam 711.

Figure 7:
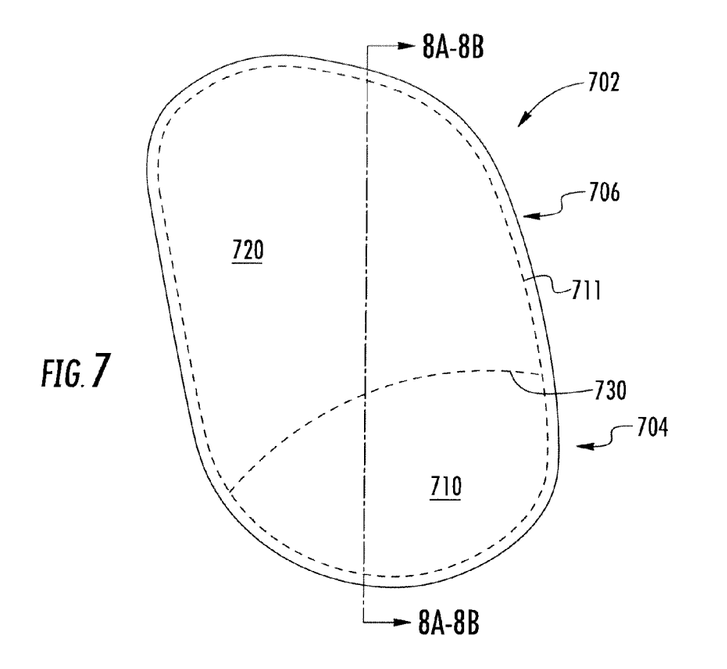
FIG. 7 is a side view of an airbag cushion for use in the airbag module of FIG. 6.

As shown in FIG. 7, the airbag cushion includes two panels 710a, 710b coupled together at outer seams 711 to form the inflatable portion of the cushion 702 that is defined by the periphery of the panels 710a, 710b. As shown in FIG. 8A, the airbag cushion 702 also includes a pair of inner walls 732 that extend across the width of the airbag cushion 702 to thereby separate the inflatable portion of the cushion into an upper inflatable region 706 (or chamber 720) and a lower (e.g., pelvis) inflatable region 704 (or chamber 710). The first inner wall 732 is coupled to the inside surface of one of the two panels 710a, 710b, the second inner wall 732 is coupled to the inside surface of the other panel 710a, 710b, and the inner walls 732 are coupled together to thereby define a check valve 740 for controlling the flow of inflation gas between the upper and lower inflatable regions 706, 704 or chambers 720, 710. As shown in FIG. 8A, the inner walls 732 may be configured to define a check valve 740 that is located in the lower chamber 710, such as aligned in a downwardly direction. Thus, the check valve 740 may be configured to allow the inflation gas to pass into the lower inflatable region 704 or chamber 710 from the upper inflatable region 706 or chamber 720, but may prohibit the inflation gas from passing from the lower inflatable region 704 or chamber 710 to the upper inflatable region 706 or chamber 720. Alternatively, as shown in FIG. 8B, the inner walls may be configured to define a check valve 740 that is located in the upper chamber 720, such as aligned in an upwardly direction. Thus, the check valve 740 may be configured to allow the inflation gas to pass into the upper inflatable region 706 or chamber 720 from the lower inflatable region 704 or chamber 710, but may prohibit the inflation gas from passing from the upper inflatable region 706 or chamber 720 to the lower inflatable region 704 or chamber 710.

Figure 9A:
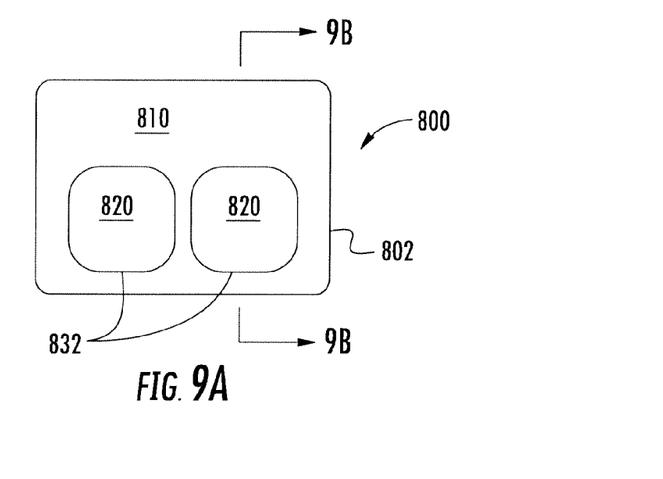
FIG. 9A is front view of a deployed airbag cushion from a knee airbag module.
Figure 9B:
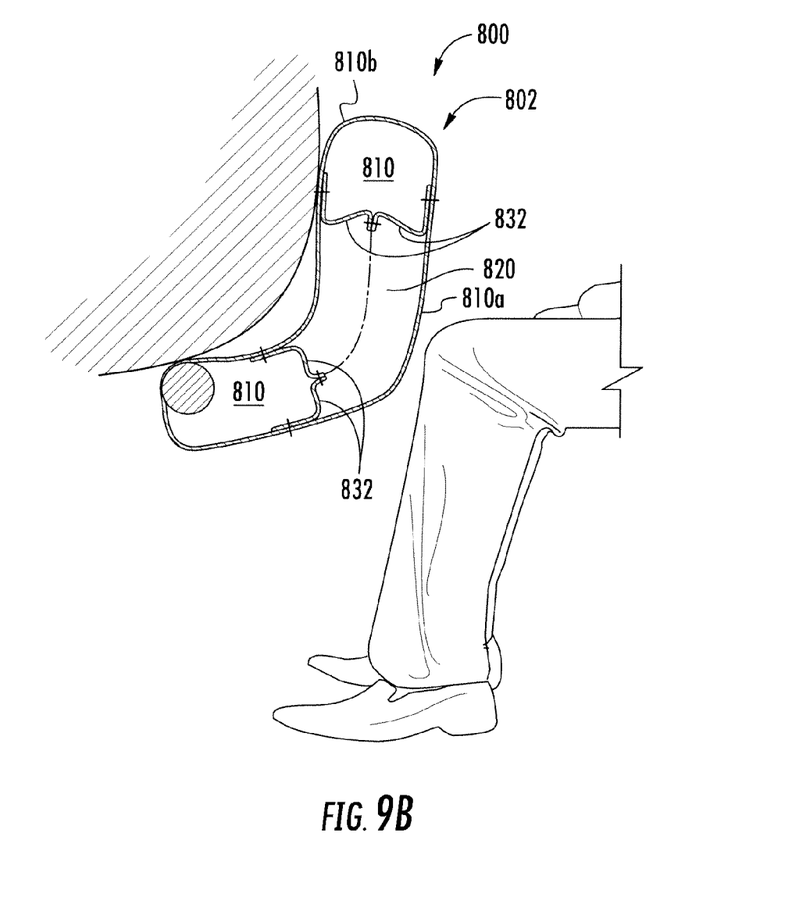
FIG. 9B is side cross-sectional view of the knee airbag module of FIG. 9A having an airbag cushion according to an exemplary embodiment.

FIGS. 9A and 9B illustrate a knee airbag module 800 that is configured to deploy to restrain the knees of an occupant, such as to prohibit the knees of the occupant from directly contacting other hard-trim components (e.g., the dashboard) during vehicle impacts, such as front-impacts. The knee-airbag module 800 includes an inflatable airbag cushion 802 having a primary chamber 810 and a pair of adjacent secondary chambers 820, where each secondary chamber 820 may be located for optimal restraint of one knee of the occupant. Each secondary chamber 820 may be defined by one or more walls 832 that extend between one or more outer panels 810a, 810b to separate the inflatable cushion into the primary and secondary chambers 810, 820.

FIG. 10 illustrates an exemplary embodiment of a driver (front-impact) airbag module 900 that includes an inflator 908 and an inflatable airbag cushion 902 having a base panel 910a, a main panel 910b, and a top main panel 910c. The base panel 910a is configured as a flow director (as shown in FIG. 10B), which allows the inflation gas from the inflator 908 to fill the cushion 902 and is coupled to the steering wheel 16 to anchor the airbag cushion 902 to the reaction surface of the steering wheel 16 to transfer loads from the airbag cushion 902 to the steering wheel 16 during loading of the deployed cushion 902. The base panel 910a is also coupled to the main panel 910b to form a first primary or guide chamber 911, where the main panel 910b is also coupled to the top main panel 910c to thereby form the periphery of the airbag cushion 902 that defines a second primary chamber 912 upon deployment. The base panel 910a and/or guide chamber 911 function to direct inflation gas from the inflator 908 into the one or more primary chambers 912. The airbag cushion 902 also includes a plurality of walls 932 that are coupled together to form a series of stacked secondary chambers 920, which are generally between or surrounded by the primary chamber or chambers 912. The walls 932 provided on the ends of the series of stacked secondary chambers 920 are coupled to the panels (e.g., base panel 910a, top main panel 910c), to thereby stack each of the secondary chambers 920 adjacent to the second primary chamber 910 and the first secondary chamber adjacent to the first primary chamber 911 that houses the inflator 908. Thus, a driver airbag 902 may include a series of stacked secondary chambers 920 from the mounting location to the contact location with the driver during deployment. The stacked secondary chambers 920 may be configured to be in fluid communication with each other, or may be configured to be separate chambers, such as by having a separator (e.g., layer of fabric) provided between the adjacent secondary chambers 920. The airbag cushion may include one or more check valves (for example, as described above with regard to FIG. 5 and formed by or between interior walls or panels 932) to control the flow between the chambers, such as from the second primary 912 chamber to one or more secondary chambers 920 of the cushion 902.

Figure 11:
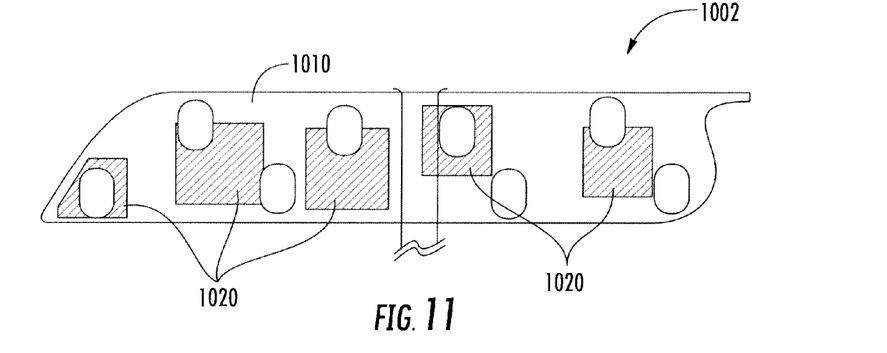
FIGS. 11 and 12 are side views of side-curtain airbag modules having airbag cushions according to exemplary embodiments.
Figure 12:
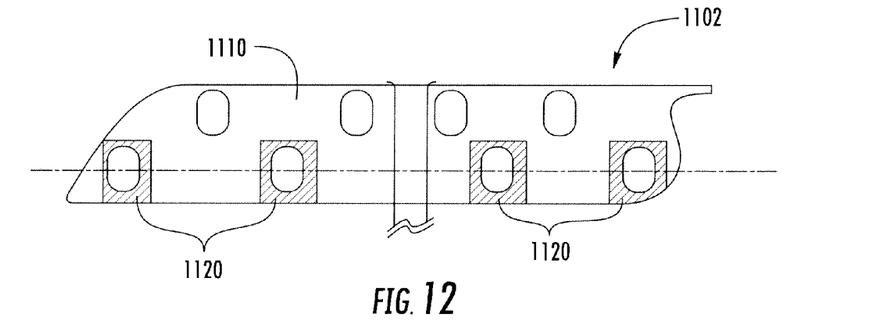

FIGS. 11 and 12 illustrate various exemplary embodiments of side-curtain airbags 1002, 1102 that are configured for use in a side-curtain airbag module to provide restraint to an occupant, such as to the head of an occupant during a side-impact to restrain the occupant and to mitigate the likelihood of occupant ejection from the vehicle. The side-curtain airbag may include a secondary chamber 1020, 1120 and a primary chamber 1010, 1110 and/or low pressure chamber. Alternatively, the side-curtain airbag may include a plurality of secondary chambers that are located at various impact locations, wherein the plurality of secondary chambers are separated by a low pressure chamber or a plurality of low pressure chambers. As shown in FIG. 11, the secondary chambers 1020 may be located to provide optimal restraint to an occupant during first impact, such as by the head of the occupant. As shown in FIG. 12, the secondary chambers 1120 may be located to provide optimal mitigation of possible occupant ejection. The secondary chambers may be configured to be larger in size relative to the portion of the occupant that is likely to impact the cushion.

Figure 13:
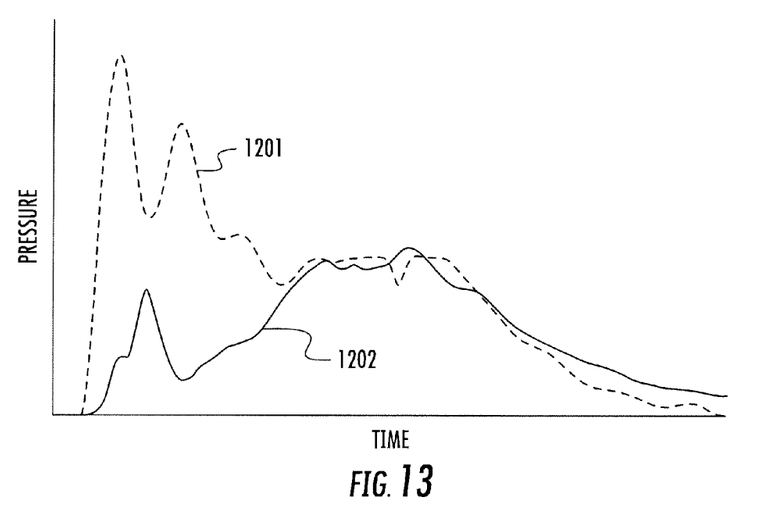
FIG. 13 is a graph showing pressure over time of a conventional airbag module and an airbag module according to an exemplary embodiment.

FIG. 13 illustrates a graph showing pressure over time comparing an airbag module having a controlled volume pelvis chamber (e.g., an inflatable region having primary and secondary chambers as described herein) and a conventional airbag cushion having a high pressure pelvis chamber. As shown, the conventional airbag cushion having the high pressure pelvis chamber inflates to a relative high initial pressure (see curve 1201), then during occupant loading the pressure in the pelvis chamber is reduced to an appropriate working pressure, such as by venting inflation gas from inside the chamber to outside the airbag cushion. The conventional airbag cushion has a relative high initial pressure in part due to the relative larger supply (e.g., volume) of inflation gas needed to inflate the relative larger volume cushion during deployment. In contrast, the airbag cushion having the controlled volume pelvis chamber achieves a substantially similar working pressure (i.e., the appropriate pressure during occupant loading) as the conventional airbag cushion with a relative lower initial pressure. The airbag cushion having the controlled volume pelvis chamber (see curve 1202) has a relative low initial pressure in part due to the reduced volume of inflation gas that is needed to inflate the controlled volume cushion. The airbag cushion having the controlled volume inflatable region inflates a primary chamber with a reduced volume of inflation gas (relative to a conventional cushion), where during occupant loading, inflation gas is transferred from the primary chamber to the secondary chamber thereby ramping up the pressure in the secondary chamber from the low initial pressure to the appropriate working pressure. The airbag cushion having the controlled volume inflatable region allows for the airbag module to be more efficient because less inflation gas is used to achieve a similar working pressure compared to the conventional airbag. Additionally, by having a relative lower peak pressure (e.g., peak initial pressure), the airbag cushion having the controlled volume inflatable region may be more beneficial, such as by reducing the likelihood of injury, to high risk occupants (e.g., out-of-position occupants, elderly occupants).

Figures 14, 14A:
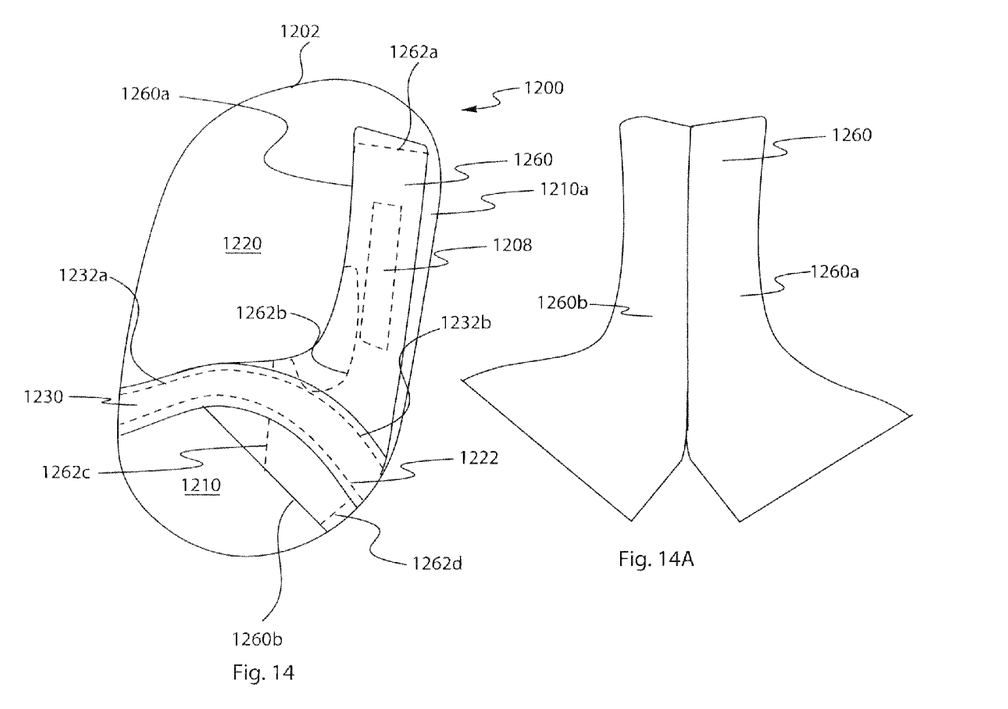
FIG. 14 is a plan view of a partial airbag module according to another exemplary embodiment.
FIG. 14A is a plan view of an inner wall panel of the airbag module shown in FIG. 14.
Figure 14B:
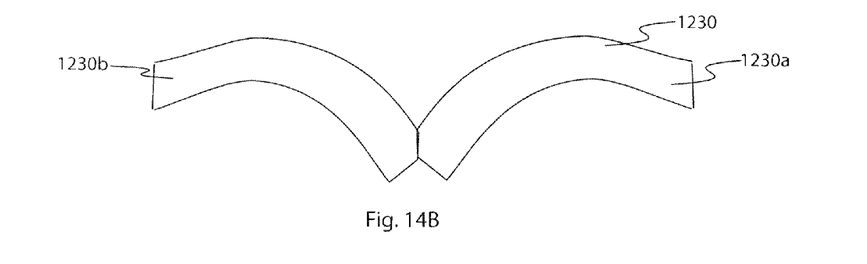
FIG. 14B is a plan view of an flow director panel of the airbag module shown in FIG. 14.

FIGS. 14-14B depict an airbag module 1200 according to another exemplary embodiment. It should be noted that, similar to FIG. 6, the inner portions of the airbag module 1200 are depicted in FIG. 14 with one of the main panels removed for illustration purposes). The airbag module 1200 generally includes an airbag cushion 1202, an inner wall 1230, and a flow director 1260. The airbag cushion 1202 is generally defined by a first main panel 1202a and a second main panel (not shown) that are coupled together at outer peripheries thereof (e.g., at seams not shown) to define an inflatable portion therebetween. The inner wall 1230 is formed generally from a single panel folded at a central seam to define first and second folded portions 1230a, 1230b. The flow director 1260 is also formed generally from a single panel folded at a central seam to define first and second folded portions 1260a, 1260b. The main panels (e.g., 1202a) of the airbag cushion 1202 are layered with the inner wall 1230 and the flow director 1260, the flow director 1260 being arranged generally between folded portions of the inner wall 1230, and the inner wall 1230 being arranged between the main panels (e.g., 1202a) of the airbag cushion. Those skilled in the art will recognized that each of the individual panels may be formed by coupling multiple panels to each other (e.g., the folded portions may be separate panels coupled to each other).

The inner wall 1230 is configured similar to the embodiments described above, wherein the inner wall 1232 is coupled to the main panels to divide the airbag cushion into a first (or upper chamber) 1220 and a second (or lower) chamber 1210. For example, the first folded portion 1230a of the inner wall 1230 is coupled to a second of the main panels (not shown) at a first or lower seam 1222 extending generally the width of the airbag cushion 1202. Similarly, a second folded portion 1230b of the inner wall 1230 is coupled to a first of the main panels 1202a at another first or lower seam (not shown). The first and second folded portions 1230a, 1230b of the inner wall 1230 are coupled to each other at a second or upper seam 1232a. When the airbag cushion 1202 is inflated, the first and second folded portions 1230a, 1230b of the inner wall 1230 are separated from each other at the lower portions (i.e., those portions coupled directly to the main panels (e.g., 1202a), while the upper portions (i.e., those portions that are coupled to each other) remain coupled together at the upper seam 1232a.

The flow director 1260 is includes first and second folded portions 1260a, 1260b, which are folded over and coupled to each other to define a first outlet 1262a configured to direct inflation gas into the first chamber 1220 and to define a second outlet 1262b configured to direct inflation gas into the second chamber 1210. More particularly, the first outlet 1262a is defined for inflation gas to enter the first chamber 1220 in a generally horizontal direction between a first (or upper) seam 1262a and a second or (or intermediate) seam 1262b. The first seam 1262a extends generally from a central fold (i.e., between the first and second folded portions 1260a, 1260b) toward outer edges of the first and second folded portions 1260a, 1260b. The intermediate seam 1262 extends in a curved manner between the outer edges of the first and second folded portions 1260a, 1260b (e.g., in a C- or J-shape). The second outlet 1260b is defined for inflation gas to enter the second chamber 1210 in a generally vertical direction between a third (or intermediate) seam 1262c and a fourth (or lower) seam 1262d. The third seam 1262c extends generally between edges of the first and second folded portions 1260a, 1260b (e.g., in a generally straight, vertically-oriented line). The fourth seam 1262d extends from the central fold of the panel defining the flow director to edges of the first and second folded portions 1260a, 1260b. Furthermore, the first and second folded portions 1260a, 1260b may be configured so as to form flaps at the outlets 1262a, 1262b, which may function as check valves (e.g., similar to those described with reference to FIG. 5). Those skilled in the art will recognize that the seams defining the first and second outlets 1260a, 1260b may be configured in other manners, each to define different flow directions into the chambers and/or by using more or fewer seams (e.g., by combining the second, third, and fourth seams 1262a-1262c).

The first and second folded portions 1260a, 1260b of the flow director 1260 may be coupled to both folded portions 1230a, 1230b of the inner wall 1230, for example, at seam 1232a (e.g., from edges of the folded portions 1260a, 1260b until generally reaching the third or intermediate seam 1262c). The first and second folded portions 1260a, 1260b of the flow director 1260 may be further separately coupled to the first and second folded portions 1230a, 1230b of the inner wall 1230, for example at seam 1232b (i.e., coupling the respective first portions 1230a, 1260a to each other at seam 1232b, as well as coupling the respective second folded portions 1230b, 1260b an another similar seam not shown), which extends generally from the third or intermediate seam 1262c to the central folds of the panels forming inner wall 1230 and flow diverter 1260 and/or to the fourth or bottom seam 1262d. Configured in this manner, the flow director 1260 and the inner wall 1230 are configured to expand or open (i.e., first folded portions 1230a, 1260a are configured to separate from second folded portions 1230b, 1260b is configured to expand or separate), such that inflation gas may enter the second or lower chamber 1210 through the second outlet 1260b. Furthermore, the inner wall 1230 and flow director 1260, by being configured with folded portions 1230a, 1230b of the inner wall surrounding the flow director 1260, function to define a channel or fluid conduit through the inner wall 1230 for inflation gas to enter the second chamber 1210. In alternative embodiments, the airbag cushion may include an opening to allow inflation gas to pass from the first chamber 1220 to the second chamber 1210.

An airbag cushion having an inflatable region with primary and secondary chambers, as disclosed herein, has several advantages, only some of which are discussed herein. First, the airbag cushion having a secondary chamber allows for a reduction in inflator output while providing at least as much restraint to the occupant, relative to convention airbags. Second, the airbag cushion having a secondary chamber provides better out-of-position occupant performance, in part due to the relative lower pressure in the cushion, such as in the non-secondary chamber inflatable portion. Third, the airbag cushion having a secondary chamber may be light weight, in part due to the relative less inflation. Fourth, the airbag cushion having a secondary chamber may have a reduced construction from a strength standpoint, in part, due to the reduction in peak pressure that the airbag cushion is subjected to during deployment. This allows the cushion to be constructed without strength reinforcements, extra strong seams, and/or increased strength fabrics or materials. Thus, the overall cost of the airbag cushion may be reduced. Fifth, the airbag cushion having a secondary chamber may be more beneficial to higher risk occupants, such as the elderly or children, by having a relative lower initial pressure that imparts relative lower reaction (e.g., impact) forces upon contact with the deploying airbag cushion. Thus, the likelihood of injury to these higher risk occupants may be reduced.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the airbag modules as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for a vehicle, comprising:
   an inflatable airbag cushion comprising one or more panels that form an inflatable portion;
   an inflator configured to provide inflation gas for inflating the airbag cushion upon deployment; and
   a flow director configured to direct the inflation gas into the inflatable portion;
   wherein the inflatable portion includes a first inflatable region and a second inflatable region formed by one or more inner walls coupled to the airbag cushion;
   wherein the flow director extends above and below the one or more inner walls, and is configured to direct the inflation gas from the inflator directly into the first and second inflatable regions;
   wherein the one or more inner walls are formed by a single inner wall panel having a central, generally upright fold that defines a first inner wall portion and a second inner wall portion on either side of the fold of the inner wall panel;
   wherein the flow director is formed by a single flow director panel having a central, generally upright fold that defines a first flow director portion and a second flow director portion on either side of the fold of the flow director panel;
   wherein the inner wall panel entirely surrounds the flow director panel to form a channel through the inner wall for inflation gas to travel therethrough.

2. The airbag module of claim 1, wherein the first inflatable region is configured to provide restraint to a pelvic region of an occupant, and the second inflatable region is positioned above the first inflatable region.

3. The airbag module of claim 1, wherein the flow director is configured to direct the inflation gas directly into the second inflatable region.

4. The airbag module of claim 1, wherein the one or more panels are coupled at one or more perimeter seams to form the inflatable portion therebetween, and the one or more inner walls are coupled to opposing sides of the airbag cushion to separate the first inflatable region and the second inflatable region.

5. The airbag module of claim 4, wherein a check valve is integrated with the one or more inner walls.

6. The airbag module of claim 5, wherein a first inner wall is coupled to a first of the opposing sides, a second inner wall is coupled to a second of the opposing sides, and the first inner wall and the second inner wall are coupled to each other to form the check valve.

7. The airbag module of claim 6, wherein the first inner wall and the second inner wall are coupled together to form a passage extending between the first inflatable region and the second inflatable region and to form an elongated body configured to close the passage.

8. The airbag module of claim 7, wherein separation of the opposing sides of the airbag cushion during inflation opens the passage to allow inflation gas to flow from the first inflatable region to the second inflatable region, and an increase in pressure in the secondary chamber relative to the primary chamber causes the body to close the passage.

9. The airbag module of claim 7, wherein the elongated body is positioned in the second inflatable region.

10. The airbag module of claim 4, wherein the one or more inner walls are coupled to the opposing sides of the airbag cushion at seams that extend generally entirely across a width of the airbag cushion.

11. The airbag module of claim 4, wherein the first inner wall portion is coupled to a first side of the airbag cushion at a first seam, and the second inner wall portion is coupled to a second side of the airbag cushion opposite the first side at a second seam, and the first inner wall portion and the second inner wall portions are coupled to each other at a third seam, such that the inner wall panel entirely surrounds the flow director.

12. The airbag module of claim 11, wherein the first flow director portion is coupled to the first inner wall portion at a fourth seam and the second flow director portion is separately coupled to the second inner wall portion at a fifth seam to thereby allow the inner wall and the flow director to open in a region between the fourth seam and the fifth seam for inflation gas to travel therethrough.

13. The airbag module of claim 4, wherein the flow director includes a first outlet configured to direct inflation gas into the first region and a second outlet configured to direct inflation gas into the second region.

14. The airbag module of claim 13, wherein the first flow director portion is coupled to the second flow director portion at an upper seam that extends from the fold of the flow director panel to outer edges of the first and second portions of the flow director panel to at least partially define the second outlet second outlet therebelow.

15. The airbag module of claim 13, wherein the first flow director portion is coupled to the second flow director portion at an intermediate seam that is generally C-shaped and positioned at an intermediate height between the first opening and the second opening.

16. The airbag module of claim 1, wherein the fold of the inner wall panel and the fold of the flow director panel are positioned generally adjacent each other.

17. The airbag module of claim 1, wherein a check valve prevents the inflation gas from flowing from the first inflatable region to the second inflatable region.

18. The airbag module of claim 17, wherein the airbag cushion, inflator, and flow director are cooperatively configured for the first inflatable region to have a higher pressure than the second inflatable region after deployment and before the airbag cushion contacts an occupant.

19. The airbag module of claim 17, wherein a lower end of the flow director forms the check valve, and the first inflatable region is arranged below the second inflatable region.

20. The airbag module of claim 17, wherein the airbag module is a side-impact airbag module.

* * * * *